United States Patent [19]

Mayrhofer

[11] 4,261,166
[45] Apr. 14, 1981

[54] PROCESS FOR OPERATING A COMBINED GAS TURBINE/STEAM TURBINE INSTALLATION WITH AN INTEGRATED PARTIAL FUEL-COMBUSTION PROCESS

[75] Inventor: Maximilian Mayrhofer, Nussbaumen, Switzerland

[73] Assignee: BBC Brown Boveri & Company Limited, Baden, Switzerland

[21] Appl. No.: 942,036

[22] Filed: Sep. 13, 1978

[30] Foreign Application Priority Data

Oct. 4, 1977 [CH] Switzerland .................. 12094/77

[51] Int. Cl.³ .......................... F02C 6/18; F02B 43/08
[52] U.S. Cl. ................................ 60/39.02; 60/39.12; 60/39.18 B
[58] Field of Search .............. 60/39.02, 39.12, 39.18 B

[56] References Cited

U.S. PATENT DOCUMENTS

| | | | |
|---|---|---|---|
| 3,164,958 | 1/1965 | Pacault | 60/39.18 B |
| 3,314,231 | 4/1967 | Hochmuth | 60/39.18 B |
| 4,028,883 | 6/1977 | Meyer-Kahrweg | 60/39.12 |

OTHER PUBLICATIONS

"Generation of Energy, without Polution of the Environment, with the Use of Gasification of Solid and Liquid Fuels of High Sulphur Content", booklet by BBC Brown Bovery Nederland BV No. NL-BBN 201N (date unknown).
"Process Systems for Conversion of Difficult Fuels to Synthetic Fuels for Baseload Gas Turbines", ASME Publication 75-GT-73 (date unknown).

*Primary Examiner*—Louis J. Casaregola
*Attorney, Agent, or Firm*—Burns, Doane, Swecker & Mathis

[57] ABSTRACT

A process for operating a combined gas turbine/steam turbine power plant having an integrated partial fuel-combustion process is disclosed wherein a portion of a supply of compressed air is fed to a combustion reactor in which a fuel is gasified. The gasified fuel is combusted to drive a gas turbine with the discharge from the gas turbine heating a waste heat steam generator. Steam is generated in a boiler heated by the gasified fuel and drives a steam turbine. The steam is saturated in the boiler and is dried and heated in a heat exchanger arranged downstream of the boiler and upstream of the waste heat steam generator. The heat exchanger is heated by the portion of the compressed air with the air further compressed immediately downstream of the heat exchanger.

4 Claims, 1 Drawing Figure

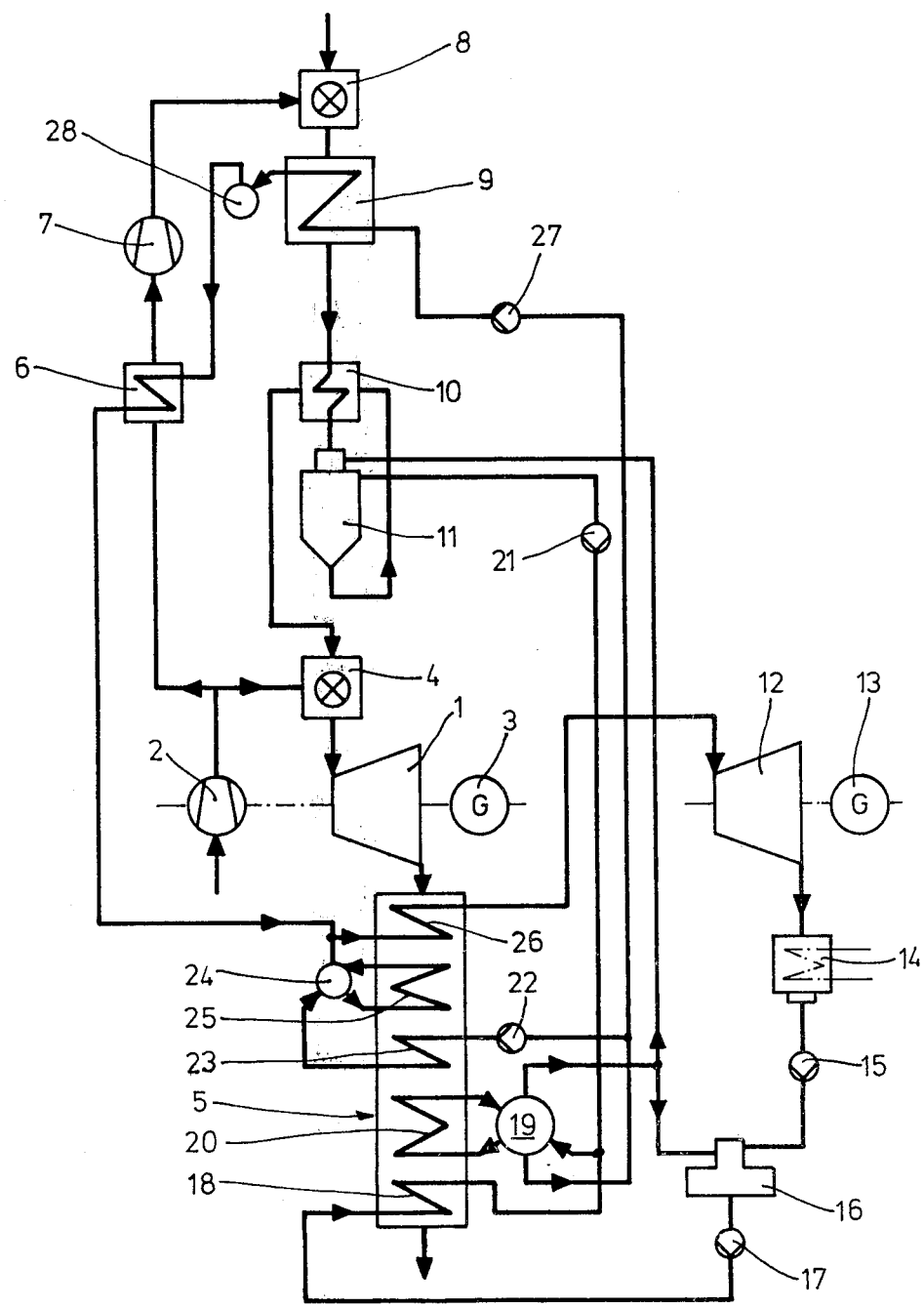

PROCESS FOR OPERATING A COMBINED GAS TURBINE/STEAM TURBINE INSTALLATION WITH AN INTEGRATED PARTIAL FUEL-COMBUSTION PROCESS

BACKGROUND AND SUMMARY OF THE PRESENT INVENTION

The invention relates to a process for operating a combined gas turbine/steam turbine installation with an integrated partial fuel-combustion process, wherein a part of the compressed combustion air is fed via a heat exchanger and a booster compressor to a gasification reactor in which a fuel is gasified, whereupon the crude gas produced is cooled in a boiler and purified and finally the pure gas is fed to the combustion chamber of the gas turbine, and wherein, moreover, saturated steam generated in the boiler is passed to the superheater of a waste heat steam generator which is charged with the off-gas from the gas turbine.

Processes of this type are applied for the production of fuels which, on combustion after purification, correspond to the currently applicable regulations with respect to atmospheric pollutions. For this purpose, a sulphur-containing fuel, for example heavy oil, is gasified in a pressure reactor, for which purpose a part of the combustion air compressed in the compressor of the gas turbine installation is utilized, and is subsequently brought in a preparation plant to a high degree of purity. The gasification is a very high-temperature process, and for this reason the gas is cooled, before purification, in at least one boiler which is charged with preheated feed water from the steam water circulation and in which, by means of the heat removed from the gas, saturated steam is generated which is subsequently superheated in the waste heat steam boiler up to the state of fresh steam and is fed to the steam turbine.

A process of the type mentioned is described and diagrammatically represented in the booklet by BBC Brown Boveri Nederland BV No. NL-BBN 201N under the title "milieuvriendelijke energie-opwekking onder toepassing van vergassing van sterk zwavelhoudende vaste en vloeibare brandstoffen [Generation of Energy, without Pollution of the Environment, with the Use of Gasification of Solid and Liquid Fuels of High Sulphur Content]". The heat removed in the heat exchanger from the compressed combustion air is utilized in this installation for a modest heating of the pure gas, before the latter is fed to the combustion chamber of the gas turbine. A disadvantage is here that the relatively small quantity of heat restricts the extent of preheating of the fuel gas.

A process described at the outset has also been disclosed in the booklet ASME Publication 75-GT-73 under the title "Process Systems for Conversion of Difficult Fuels to Synthetic Fuels for Baseload Gas Turbines". In this process, the air passing to the booster compressor is recooled in an air cooler, the heat obtained not being reintroduced into the cycle and thus representing an energy loss.

In the two known solutions, it is moreover possible that the saturated steam which is generated as the result of cooling the gas and which is under a high pressure, contains moisture which must be segregated in a water separator before the steam enters the superheater part of the waste heat steam generator. Under the prevailing pressures, it is no longer possible to dry saturated steam by letting it down from a higher pressure to the superheater pressure; the result of this would only be a further increase in the wetness of the steam.

It is the object of the invention to avoid these disadvantages and to increase the total efficiency of a combined gas turbine/steam turbine installation of the type mentioned at the outset.

According to the invention, this is achieved when the saturated steam is dried and pre-superheated in the heat exchanger.

The advantages of the invention are in particular that, on the one hand, the heat stress at the delivery of the booster compressor is restricted to admissible values by the recooling of the compressed gasification air and that, on the other hand, the pre-superheated steam can by-pass the high-pressure drum of the waste heat boiler and the water separator thereof. Since only a part of the working medium of the steam turbine has the flow through these items of equipment, the latter can be designed to have smaller dimensions and thus to be more economical.

BRIEF DESCRIPTION OF THE DRAWING

In the drawing, an illustrative embodiment of a preferred embodiment of the subject of the invention is shown diagrammatically. Parts which are not essential to the invention, such as, for example, the drive of the booster compressor, the purification of the fuel gas in detail and the diverse regulating and control instruments, are not shown. The direction of flow of the various working media is marked with arrows.

DETAILED DESCRIPTION OF THE PREFERRED EMBODIMENT OF THE PRESENT INVENTION

The gas turbo set of the combined gas/steam turbine power station essentially consists of the gas turbine 1, the compressor 2 and the generator 3. Combustion air is compressed in the compressor 2 and enters the combustion chamber 4 to which pure gas is charged as the fuel. The hot gases obtained in the combustion process are expanded in the gas turbine 1, releasing their energy; the off-gases release their heat in the waste heat steam generator 5 which, in the example shown, is a dual-pressure steam generator.

A part of the compressed air is branched off before entering the combustion chamber 4, recooled in a heat exchanger 6 and then compressed to a higher pressure in a booster compressor 7 and fed to a gasification reactor 8. Recooling of the compressed air is carried out in order not to exceed the admissible material stress of the rows of blades at the delivery of the booster compressor.

A fuel of, as a rule, higher sulphur content, for example heavy oil or coal, is gasified in the gasification reactor 8 with the aid of the air which is now hot as a result of the recompression. After passing through this high-temperature process, the crude gas generated releases a part of its heat in a boiler 9 and another part in a pure gas preheater or crude gas cooler 10. In a manner which is in itself known, the crude gas is brought to a high degree of purity in a crude gas treatment plant 11, that is to say, soot and sulphur in particular are removed from the gas. The pure gas is subsequently reheated in the preheater 10 and fed to the combustion chamber 4 of the gas turbine.

The steam turbo set, shown highly simplified, essentially consists of the steam turbine 12 and the generator 13 coupled thereto. The steam which has been let down in the steam turbine 12, is condensed in the condenser 14. The water formed is conveyed by the condensate pump 15 into the feed water tank 16 and is conveyed from there by the low-pressure feed pump 17 into the low-pressure preheater 18 of the waste heat steam generator 5. Subsequently, it passes into the low-pressure drum 19. A first part of the preheated feed water is converted in the low-pressure vaporizer 20, and a part of it is passed as saturated steam via the low-pressure drum 19 to the feed water tank 16 for preheating and degassing the feed water and a part is fed to the crude gas treatment plant 11. In the latter, the saturated steam is used inter alia for soot removal and sulphur removal from the crude gas. The condensate thus obtained is conveyed via a recycle pump 21 back into the low pressure drum 19. A second part of the preheated feed water is conveyed by the high-pressure feed pump 22 into the high-pressure preheater 23 of the waste heat steam generator 5 and from there into the high-pressure drum 24. This quantity is vaporized with forced circulation in the high-pressure vaporized 25. In the superheated 26, downstream of the high-pressure drum 24, it is brought to the state of fresh steam and then fed to the steam turbine 12 in which the steam is let down, releasing its energy.

The third part of the preheated feed water is conveyed by the pressure-boosting pump 27 into the boiler 9 of the crude gas plant. The pressure is boosted to such an extent that the high-pressure saturated steam generated in the boiler has, taking into account all the subsequent pressure drops, a pressure which corresponds at least approximately to the steam pressure downstream of the high-pressure vaporized 25. From the saturated steam drum 28 of the boiler 9, the steam passes into the superheater 26 of the dual-pressure steam generator in which it is superheated, together with the quantity of steam from the high-pressure drum 24, to the state of fresh steam.

To this extent, equipment and processes for the operation thereof are known. However, high-pressure saturated steam from a steam drum contains moisture. The latter must be removed in a water separator before entry into the superheater 26, and this is accomplished as a rule in a separator which is incorporated in the high-pressure drum 24.

According to the invention, the high-pressure saturated steam now flows first through the heat exchanger 6 and is dried and slightly superheated in the latter by the heat removed from the compressed combustion air. The heat exchanger 6 accordingly fulfils the functions of an air cooler and a steam drier and pre-superheater. The slightly superheated steam then passes directly into the superheater 26. A considerable part of the working medium of the steam turbine accordingly does not flow through the high-pressure drum 24, so that the latter can have substantially smaller dimensions, that is to say it must be designed merely to receive the high-pressure feed water and the steam generated in the high-pressure vaporizer 25. This is of particular advantage if the entire installation is operated only under part load and also in the case where the boiler 9 is shut down and the gas turbine unit is run with extraneous fuel.

For a better understanding of the process, it is explained by reference to a numerical example. It is understood that, within the present scope, not all the absolute values on which the calculations are based, are quoted since these have a limited meaning because of their dependence on an excessive number of parameters.

Assuming that ambient air of 15° C. is drawn in by the compressor 2 of the gas turbo set and the installation is operated under full load, the air temperature after the compressor is approximately 335° C. Between 16 and 20% of this compressed air is branched off and recooled to 300° C. in the heat exchanger 6. This temperature allows the booster compressor 7 to be run without risk. If the saturated steam generated in the boiler 9 is under a pressure of 50 bars and at the corresponding saturated steam temperature, a superheating of the saturated steam by 70° C. is attainable in the heat exchanger 6 with the given quantities of air and steam.

These values apply to the case where the quantitative ratio of boiler steam to total fresh steam is about 0.6 and where the gas turbine unit and the steam turbine unit deliver approximately the same output.

The improvement achievable in the efficiency of the installation can of course not be expressed numerically without further details, but it should not be difficult for those skilled in the art to recalculate the improvement in comparison with the known methods.

The principles, preferred embodiments and modes of operation of the present invention have been described in the foregoing specification. The invention which is intended to be protectred herein, however, is not to be construed as limited to the particular forms disclosed, since these are to be regarded as illustrative rather than restrictive. Variations and changes may be made by those skilled in the art without departing from the spirit of the present invention.

What is claimed is:

1. In a process for operating a combined gas turbine/-steam turbine power plant having an integrated partial fuel-combustion process wherein a first portion of a supply of compressed air compressed by a first compressor and further compressed in a second compressor is fed to a combustion reactor, a fuel being gasified in the combustion reactor, cooled in a boiler to generate saturated steam and purified, the gasified fuel being fed to a combustion chamber of a gas turbine, and wherein the saturated steam is superheated in a waste heat steam generator by the discharge of the gas turbine driven by combustion of the gasified fuel, the improvement wherein the saturated steam is dried and pre-superheated in a heat exchanger which is arranged downstream of the boiler and upstream of the waste heat steam generator, the heat exchanger also being arranged upstream of the combustion reactor and between the first compressor and the second compressor.

2. The process of claim 1 further comprising the step of:
    collecting the saturated steam in a steam drum immediately upstream of the heat exchanger.

3. The process of claim 1 further comprising the step of:
    collecting a portion of the dried and pre-superheated saturated steam in a high-pressure drum downstream of the heat exchanger.

4. The process of claim 1 wherein the improvement further comprises the step of:
    supplying at least a portion of the steam from the heat exchanger directly to the waste heat steam generator and then to a steam turbine.

* * * * *